Sept. 16, 1941.　　　J. A. W. SCOTT　　　2,256,412
HOROLOGIC INSTRUMENT
Filed April 24, 1939　　　3 Sheets-Sheet 1
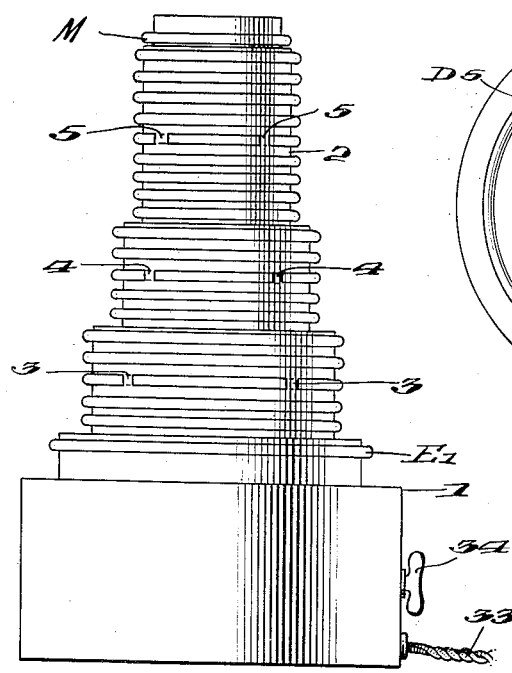
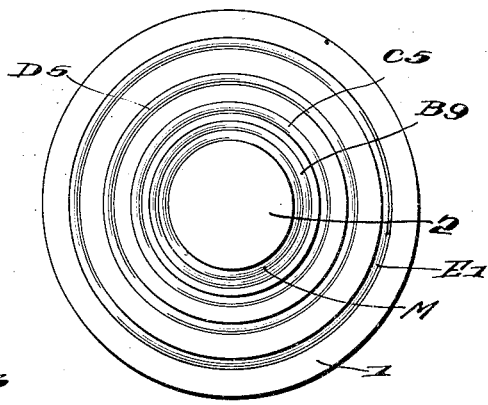
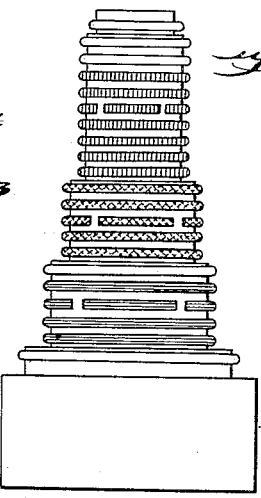
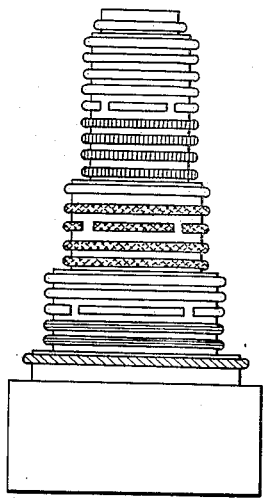
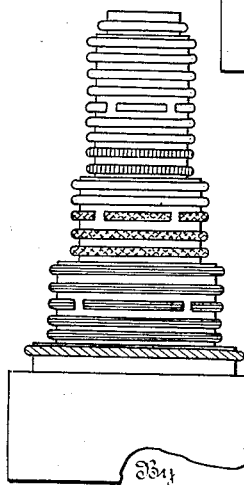
Inventor
James A. W. Scott
By
his Attorney

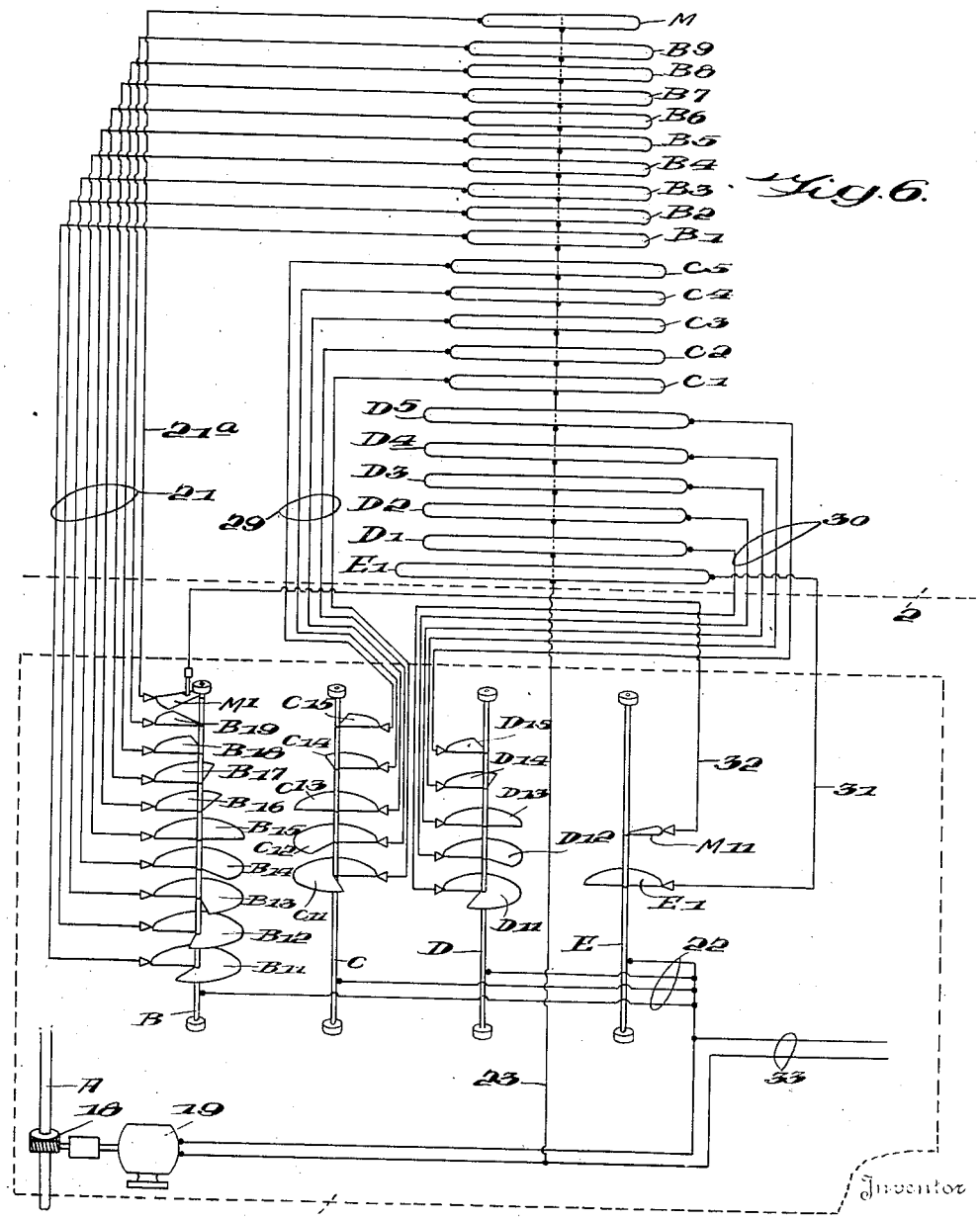

Sept. 16, 1941.           J. A. W. SCOTT           2,256,412
                        HOROLOGIC INSTRUMENT
                       Filed April 24, 1939         3 Sheets-Sheet 3
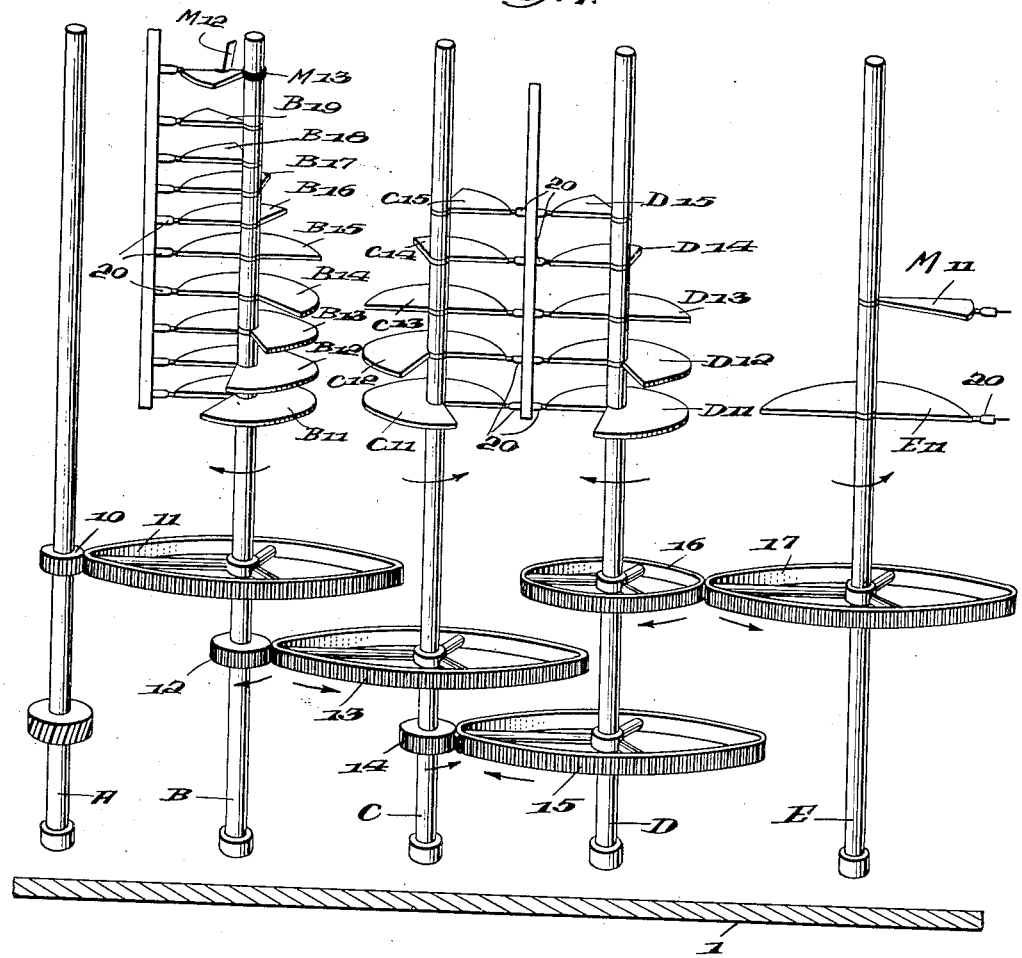
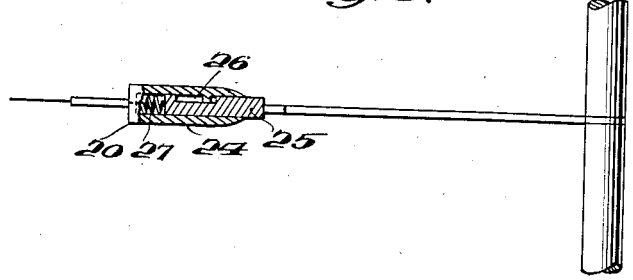

Patented Sept. 16, 1941

2,256,412

UNITED STATES PATENT OFFICE 2,256,412

HOROLOGIC INSTRUMENT

James A. W. Scott, Buffalo, N. Y.

Application April 24, 1939, Serial No. 269,725

10 Claims. (Cl. 58—50)

This invention relates to an improvement in horologic instruments.

The object of the invention is to provide for the indication of time without employing an ordinary dial such as has been considered necessary in clocks heretofore, and to provide for the indication of time in approximately all directions.

An ordinary clock dial is usually in one plane, and where it is desired to give a time indication in other directions, separate clock faces are necessary, each using its own clock mechanism. A multiplicity of clock faces with the necessary clock mechanisms therefor, is necessarily expensive, and is provided only in four-faced clocks.

An ordinary clock dial may be read, theoretically, through an angle of 180°, that is, from any point within 90° on either side of the perpendicular from the face of the clock; practically, however, the limits of such readability are not over 75° on either side of said perpendicular, or, through an angle of approximately 150°, which angle is bisected by the perpendicular to the face.

The present invention has provision for indicating time in all directions, 360°, whereby its time indication may be read and understood from any point of observation laterally of the device. This is possible in the present invention without any appreciable increase in cost in the construction of the device.

In carrying out this object, I utilize a series of indications, such for instance as indicating bands that are adapted to be illuminated or otherwise presented for view in one or all directions, which will indicate according to the bands or other indications illuminated or presented for view, the time in terms of hours and minutes relative to some definite predetermined time, as 12:00. These indications are given in the numbers of hours and minutes from the starting time of 12:00. The device indicates the time to the nearest preceding minute according to the indication presented for view, and without the use of dials, hands, or other usual clock devices, except as it may be time controlled.

In carrying out this invention, I have devised a preferred embodiment thereof, which is illustrated in the accompanying drawings, in which:

Fig. 1 is a side elevation of the time indicating device involving this invention;

Fig. 2 is a top plan view thereof;

Figs. 3, 4 and 5 are side elevations of the device, indicating different periods of time;

Fig. 6 is a diagrammatic view showing the controls for the respective indicators;

Fig. 7 is an enlarged perspective view of the timing mechanism for the device; and Fig. 8 is a detailed side elevation partly in section, of one of the contacts used in the timing mechanism.

In the form of the invention illustrated in Figs. 1 to 5, the device is shown as provided with a base designated generally by the numeral 1, from which extends an upstanding column 2. This column 2 is shown as provided with a plurality of sections of different diameters, one for each unit of indicators associated therewith, which are shown as bands surrounding the respective sections of the column 2.

In this form of the invention, the indicators for time consist of twenty-one illuminated bands surrounding the circular column 2 and arranged one above another, as shown in Figs. 1 and 3 to 5. Thus the bands present the general effect of a group of coaxial cylinders, but of different diameters and heights according to the number of bands in the respective groups. Each band, as shown, is circular in form and lies in a plane normal to the axis of the column, which plane would be horizontal when the device stands upright with the base resting on a support.

The lowest circular band shown is designated E1, and is the largest in diameter, designed to represent six hours of time.

Immediately above the band E1 and surrounding the next smaller section of the column 2, are five bands, all of the same diameter as each other, but appreciably smaller in diameter than the band E1. These five bands are designated respectively D1, D2, D3, D4, and D5. Each of these bands represents one hour of time. The third or middle band D3 does not form a continuous circle, having blank portions 3 therein, spaced apart at an appreciable distance of approximately 90° to facilitate the reading of the device.

Immediately above the set of one-hour bands D1—D5, is another unit of five bands similar to those described above, which five bands are designated respectively C1—C5. These bands are of smaller diameter than the bands D1—D5, and each represents a period of time of ten minutes. The third or middle band C3 is also shown as provided with gaps 4 to facilitate reading.

Above the bands C1—C5 is another unit of ten one-minute bands, all appreciably smaller in diameter than those therebelow. These bands are designated respectively B1—B9, of which the fifth or middle band B5 is provided with gaps 5 therein to facilitate reading as described. Each of these bands B1—B9 represents one minute of time.

Immediately above the one-minute bands, is a single band of appreciably smaller diameter than the former and which also represents one minute of time, which band is designated M. This band will be illuminated only twice a day, at midnight and at noon, remaining illuminated for one minute thereafter.

It will be evident that the time represented by the entire twenty-one bands is twelve hours, there being one six-hour band, five one-hour bands, five ten-minute bands and ten one-minute bands, the latter including the special band M.

Thus, at the instant of 12:01 (either a. m. or p. m.) the lowermost of the nine regular one-minute bands, BI, will light up, and alone will be illuminated during the minute intervening between 12:01 and 12:02. At 12:02 the next higher one-minute band, B2, will be illuminated, and BI, already illuminated, will remain so; at 12:03, B3 lights up and the first two remain lighted; and so on. At the instant of 12:10 the nine one-minute bands, which, during the past minute, have all been illuminated, are extinguished, and simultaneously the lowermost of the ten-minute bands, CI, becomes lighted. CI alone remains lighted during the minute between 12:10 and 12:11, but at 12:11 the lowermost minute band, BI, joins it, and so the procession of the minutes repeats until at 12:20 all the B bands relapse into darkness and C2, the second ten-minute band, joins CI in illumination. This procedure continues until, during the minute of 12:59–1:00, the five ten-minute and all nine one-minute bands are lighted. At the instant of 1:00 all these bands are extinguished and the first one-hour band, D1, lights up. At 1:01, BI joins DI in illumination, and with the addition of DI being lighted all the while, the procedure outlined above for the first hour is repeated. At 2:00, D2 becomes lighted, and so on. During the minute 5:59–6:00, all D, C, and B bands are illuminated. At the instant of 6:00 all of the above-mentioned lighted bands, are extinguished, and EI, the six-hour band, is simultaneously illuminated. During the next six hours EI remains lighted, and the procedure of the D, C, and B bands, as outlined above, is repeated, until, during the minute 11:59–12:00, all except the topmost band M, are lighted. At 12:00 all of the bands are extinguished, and M lights up, alone remaining lighted during the minute 12:00–12:01. Thus the band M, illuminated, represents the minute following noon or midnight. At 12:01 M goes out and BI lights up, and the entire twelve-hour cycle repeats.

In the examples illustrated in Figs. 3, 4 and 5, it will be apparent that the time may be readily computed by adding together the amounts represented by the bands illuminated. Thus, in Fig. 3, the hour represented is 4:57, representing four hours and fifty-seven minutes following 12:00, as indicated by the four one-hour bands, five ten-minute bands and seven one-minute bands that are illuminated.

In Fig. 4, the hour represented is 8:44, indicated in the illumination of the six-hour band EI, two one-hour bands, four ten-minute bands and four one-minute bands.

In like manner, it will be evident that the hour represented in Fig. 5 is 11:32.

In thus reading the time represented by the respective bands, the gaps 3, 4, and 5 therein provide the eye with "stepping stones" to facilitate the counting, such gaps being formed in the middle band of each group, which is the third in each of the first two units and the fifth in the upper unit. This will enable a person to note the illumination of these broken bands and to count from that point in an upward direction.

It will be evident that the gaps may be formed in any desired manner, as by covering or painting portions of the tubing at intervals, or by turning the sections of tubing inwardly through the wall of the column at these intervals, or by forming each of these bands of a plurality of sections, but as thus formed, they should be wired together for simultaneous illumination.

The illumination of the respective bands is controlled by a timing mechanism which is preferably housed within the device, and where the device is of reasonably small size, as illustrated, this timing mechanism may be housed within the base 1, although it is evident that if the column 2 be made sufficiently large, it may be housed therein. In the form of the invention shown however, the timing mechanism is housed within the base.

The construction of the timing mechanism is illustrated generally in Figs. 6, 7 and 8, Fig. 6 showing the timing mechanism diagrammatically with its connections to the respective bands.

Referring to Fig. 7, the timing mechanism is shown as comprising five shafts designated A, B, C, D and E respectively, which are geared together through speed reducing gearing, as shown, the shaft A being provided with a pinion 10 thereon meshing with a gear 11 on the shaft B. The latter carries a pinion 12 meshing with a gear 13 on the shaft C. The latter carries a pinion 14 meshing with a gear 15 on the shaft D. The latter carries a small gear 16 meshing with a larger gear 17 on the shaft E. This gearing provides a speed reducing ratio between the respective shafts of from one to ten between shafts A and B; from one to six between shafts B and C; from one to six between shafts C and D; and from one to two between shafts D and E. The shaft A is driven at a speed of one R. P. M. Thus the shaft B will revolve once in ten minutes; the shaft C, once in one hour; the shaft D, once in six hours; and the shaft E, once in twelve hours. The shaft A is shown as driven through gearing 18 from an electric motor 19.

The shaft B is shown as carrying ten disk segments fixed thereon, parallel with each other and perpendicular to the axis of the shaft, which segments are designated respectively B11—B19 and M1, correspondingly respectively with the bands BI—B9 and M. These respective disk segments B11—B19 are formed of respectively different degrees, the segment B11 being 324°; B12, 288°; B13, 252°; B14, 216°; B15, 180°; B16, 144°; B17, 108°; B18, 72°; B19, 36°; and M1, 36°.

Fixed in the base 1 is a support carrying a series of contacts, each designated generally by the numeral 20 and having frictional engagement with the peripheries of the respective disk segments B11—B19 and M1, which contacts are connected through a cable containing wires 21 with the corresponding bands BI—B9 and M, as is illustrated in Fig. 6.

One side of a source of an electric current is connected with each of the shafts B, C, D and E, through supply circuit 22 having bearing contacts with said shafts, which supply circuit is also connected with the electric motor 19 and has a return circuit 23 extending from and common to all of the bands, being connected with the opposite side of the source of electrical supply from the circuit connections with the shafts, and being connected with the opposite sides of the bands from the circuit connections therewith.

Each of the contacts 20 is fixed in the casing in position to be engaged by the corresponding disk segment, and may be connected substantially as shown in Fig. 8. In this form, the contact 20 has a casing 24 slidably receiving a contact pin 25 having a pin and slot connection 26 therebetween to limit the outward sliding movement of the contact pin which is pressed outward by a spring 27. Thus the contact pin 25 is held in position to engage the periphery of its disk segment and to yield sufficiently to bear thereagainst during the rotation of the disk segment, maintaining an electrical contact therewith.

It will be apparent that during rotation of the shaft B, when the disk segments thereof are in engagement with the respective contacts 20, electrical circuits will be completed through the wires 21 to cause illumination of the corresponding bands B1—B9. It will be evident from Figs. 6 and 7 that these segments will engage their contacts successively from top to bottom, causing successive illumination of the bands B1—B9 from bottom to top. As the contact segments pass out of engagement with the contacts, which they will do simultaneously as to all except the segment M1, the circuits are broken, deenergizing the illuminated bands.

As shown in Figs. 6 and 7, all of the disk segments, except M1 and M11, are in the positions which they will occupy immediately before simultaneously moving out of engagement with their respective contacts 20, at the instant before 12:00 noon or midnight. As the contact disks B11—B19 move out of engagement with their respective contacts, the contact disk M1 moves into engagement with its contact, whereby the band M is caused to be illuminated for one minute after 12:00. The shaft B rotates once in ten minutes and controls the one-minute bands B1—B9. Thus at 12:01, the contact disk B11, having rotated through 36° during the illumination of band M, engages its contact 20 and causes an illumination of the band B1. Since all disk segments are fixed to the shaft and rotate together, they will be turned 36° per minute, thus successively engaging their respective contacts at one-minute intervals and successively energizing the respective bands B1—B9. At ten-minute intervals, all of the disk segments B11—B19 will have been rotated through a full revolution and back to the position shown in Figs. 6 and 7, simultaneously moving out of engagement with their contacts as the next succeeding section or unit is illuminated.

The shaft C is provided with five disk segments C11, C12, C13, C14 and C15, similar in construction to the disk segments carried by the shaft B, except that these disk segments extend through different degrees, the disk segment C11 extending through 300°; the disk segment C12, 240°; the disk segment C13, 180°; the disk segment C14, 120°; and the disk segment C15, 60°. The shaft C rotates once per hour and controls the ten-minute bands, whereby it rotates 60° for each ten minutes.

Shaft D is similar in all respects to shaft C, and carries the same number of disk segments D11—D15, corresponding in size with the segments C11—C15. Shaft D rotates in the opposite direction from the shaft C and turns one revolution in six hours, controlling the one-hour bands of the device, and causing an illumination of an additional band each hour. The contacts 20 which co-act with the disk segments D11—D15 are connected through wires 30 with the one-hour bands D1—D5.

Shaft E carries a disk segment E11 of 180°, the contact of which is connected through a wire 31 with the band E1. Shaft E is rotated one revolution in twelve hours, whereby the band E1 will be illuminated throughout six hours, at six-hour intervals.

Shaft E also carries a disk segment M11, of slightly less than 5° of turn (approximately 4½°). This disk segment M11 is fixed on the shaft E in such a position that at 12:00 it is half-way past its contact. Therefore, since the contact segment M11 requires approximately nine minutes to pass its contact, it will close the contact at about 4½ minutes before 12:00 and will open its contact at about 4½ minutes after 12:00, this occurring only twice each day. The contact for disk segment M11 is connected through a wire 32 with a contact brush M12 in position to engage the surface of disk segment M1 on the shaft B.

Disk segment M1 is mounted on the shaft B by an insulating ring M13 so that it does not receive current through the shaft. Therefore, although the disk segment M1 engages its contact once every ten minutes in the rotation of the shaft B, at the instant that the disk segments B11—B19 disengage their contacts, said disk segment M1 receives current only through the shaft E, disk segment M11, and wire 32, which circuit is closed only once every twelve hours during the time that disk segment M1 engages its contact. However, several minutes before 12:00, the disk segment M11 has engaged its contact for the wire 32, ready to complete the circuit instantly that the disk segment M1 engages its contact at 12:00 thus completing the circuit through the corresponding wire 21a leading to the uppermost band M, causing an illumination thereof, during an interval of one minute when these contacts remain closed.

Immediately following this one-minute interval, the disk segment B11 will engage its contact to close a circuit to the band B1 which becomes illuminated simultaneously with the deenergizing of the band M.

The different groups or units of bands are preferably of different colors to facilitate reading of the time represented by the respective bands.

In the form of the invention shown, it is preferred to provide the illumination of the bands by space-discharge in a gaseous atmosphere containing any of the usual gases, such as neon, argon, helium, mercury vapor, etc. However, the illumination may be provided by incandescent lamps, or other means of illuminating or presenting for view the respective elements.

It will be apparent also that the size and shape of the respective bands may be variated as desired, both individually and collectively. The bands may be annular, in straight lines, or in the shape of polygons; and the column may be arranged to form a sphere, concentric circles, cone, or other shape, as desired.

Although twenty-one bands are shown and described, and which more effectively fulfill the requirements of this device, this number will not be essential, as other groups of bands may be provided if desired.

For use outdoors during daylight or strong sunlight, the illumination of bands will be enhanced by shading with a canopy or directing their light. Also, for such outside use, the unit should be a construction appreciably larger than for indoor use, in which event the controlling mechanism may be enclosed within the column or separately mounted.

It will be apparent that the time can be determined definitely and accurately within one-minute intervals, even for outdoor use and from all directions at no appreciable extra expense, which is not usually possible with most outdoor clocks, even of four faces, because this invention has a maximum margin of divergence from true time of slightly less than one minute, whereas intervals of one minute can not be read conveniently from the face of the usual outdoor clocks, and the observer tends to read time in terms of the nearest five minute point, which provides an error of several minutes, not encountered in this invention.

Another advantage in this invention is the fact that the time may be read quite as accurately by reflection as by direct observation, which is not possible in the usual clock, thus making this invention especially practical in any room where there is a considerable number of mirrors, or adapting it to direct an indication of the time to different points by means of mirrors.

Because this device does not utilize the usual dial or time indications, but indicates the time in a different manner, yet the time may be computed therefrom readily with very little experience and observation, the different colors and arrangement of the bands, as well as the gaps provided in certain of the bands, facilitate the counting operation.

The invention shown in Fig. 1 is a practical size such that it may be used readily to indicate the time, and it is complete and self contained, having only an electric cable containing the wires 33 adapted to be plugged into a convenient electric outlet when it will be ready for use. This shows also a setting key 34 in a side of the base which is connected with a shaft inside the base geared to the shafts A—E to reset these to their correct positions according to the time when the device is started or adjusted.

I claim:

1. A horologic device comprising an elongated support having a plurality of indicating elements arranged thereon in groups with the elements of each group spaced apart lengthwise of the support and with the respective groups spaced lengthwise thereof representing respectively different periods of minutes and hours, and time controlled means for causing a successive indication by the respective indicating elements of each group, and causing successive indication by the respective groups of elements.

2. A horologic device comprising an elongated support having a plurality of indicating elements arranged thereon in groups with the elements of each group spaced apart lengthwise of the support and with the respective groups spaced lengthwise thereof adapted to represent respectively different periods of time and with the elements in each group lineally spaced from each other, and time controlled means for presenting to view the respective indicating elements.

3. A horologic device comprising an elongated support having a plurality of illuminating elements arranged thereon in groups with the elements of each group spaced apart lengthwise of the support and with the respective groups spaced lengthwise thereof adapted to represent different periods of time with the elements of each group lineally spaced from each other, and time controlled means for causing successive illumination of the elements of each group and of the respective groups.

4. A horologic device comprising a support having a plurality of illumination bands arranged thereon in lineally spaced relation and arranged in separate groups adapted to represent different periods of minutes and hours, and time controlled means for causing successive illumination of the respective groups and of the respective bands in each group.

5. A horologic device comprising an upstanding column having a series of annular bands surrounding said column concentrically thereof and lineally spaced therealong adapted to represent different periods of time, and time controlled means for regulating the illumination of the respective bands.

6. A horologic device comprising an upstanding column having a plurality of annular bands surrounding the same and arranged concentrically thereof, said bands being spaced apart lineally of the column and arranged in different groups to represent different periods of time, and time controlled means for regulating successive illumination of the bands and successive illumination of the groups of bands to represent different periods of time.

7. A horologic device comprising an upstanding column having a plurality of illuminating bands surrounding said column concentrically thereof, said bands being spaced apart lineally of the column and arranged in these groups with the bands of one group of smaller diameter than the bands of the next lower group, the respective groups of bands being adapted to represent different periods of time in minutes and hours, and time controlled means for regulating the illumination of the bands for causing successive illumination of the bands in each group and successive illumination of the respective groups of bands.

8. A horologic device comprising an upstanding column having a plurality of illuminating bands surrounding said column concentrically thereof, said bands being spaced apart lineally of the column and arranged in these groups with the bands of one group of smaller diameter than the bands of the next lower group, the respective groups of bands being adapted to represent different periods of time in minutes and hours, and time controlled means for regulating the illumination of the bands for causing successive illumination of the bands in each group and successive illumination of the respective groups of bands, at least one group of a plurality of bands including a band having circumferentially spaced gaps therein.

9. A horologic device comprising a plurality of elongated illuminating bands spaced apart laterally and adapted to represent different periods of time, and time controlled means for regulating the illumination of the respective bands.

10. A horologic device comprising an elongated support, a plurality of elongated illuminating bands extending transversely of and carried by the support and linearly spaced therealong adapted to represent different periods of time, and time controlled means for regulating the illumination of the respective bands.

JAMES A. W. SCOTT.